(12) United States Patent
Gaid

(10) Patent No.: US 8,920,644 B2
(45) Date of Patent: Dec. 30, 2014

(54) WATER TREATMENT METHOD INCLUDING POWDERED ACTIVATED CARBON RECYCLING

(75) Inventor: Abdelkader Gaid, Paris (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 647 days.

(21) Appl. No.: 13/063,476

(22) PCT Filed: Sep. 11, 2009

(86) PCT No.: PCT/EP2009/061817
§ 371 (c)(1),
(2), (4) Date: Apr. 27, 2011

(87) PCT Pub. No.: WO2010/029155
PCT Pub. Date: Mar. 18, 2010

(65) Prior Publication Data
US 2011/0192795 A1  Aug. 11, 2011

(30) Foreign Application Priority Data
Sep. 11, 2008  (FR) ...................... 08 56110

(51) Int. Cl.
*B01D 33/00* (2006.01)
*C02F 9/00* (2006.01)
*B01D 15/00* (2006.01)
*C02F 1/28* (2006.01)
*C02F 1/44* (2006.01)
*C02F 1/78* (2006.01)
*B01D 61/16* (2006.01)

(52) U.S. Cl.
CPC . *C02F 1/283* (2013.01); *C02F 1/78* (2013.01); *B01D 61/16* (2013.01); *B01D 2311/25* (2013.01); *C02F 1/444* (2013.01)
USPC ........ 210/196; 210/195.2; 210/760; 210/805; 210/627; 210/638; 210/639

(58) Field of Classification Search
None
See application file for complete search history.

(56) References Cited

U.S. PATENT DOCUMENTS 3,853,764 A * 12/1974 Armstrong ................ 210/195.1
3,876,536 A *  4/1975 Pradt et al. ................... 210/609
(Continued)

FOREIGN PATENT DOCUMENTS

FR    2696440    4/1994
FR    2891540    4/2007
(Continued)

OTHER PUBLICATIONS

Huau, M.-C. et al.; "Optimiser le traitement de potabilisation"; TSM No. 3, Mar. 2002, pp. 54-59, Doc. No. XP008027362.
(Continued)

*Primary Examiner* — Nam Nguyen
*Assistant Examiner* — Richard Gurtowski
(74) *Attorney, Agent, or Firm* — Coats & Bennett PLLC

(57) ABSTRACT

A method of producing drinking water from wastewater comprises ozonating the wastewater and treating the wastewater with powdered activated carbon (PAC). The ozonated wastewater and the PAC are mixed together in a contacting zone. The mixture of PAC and wastewater is directed through a membrane filtration unit that separates a PAC rich concentrate from treated water. The PAC rich concentrate is recirculated to the contacting zone to increase the concentration of PAC in the contacting zone.

12 Claims, 2 Drawing Sheets

(56) References Cited

U.S. PATENT DOCUMENTS

| | | | |
|---|---|---|---|
| 3,932,278 A | * | 1/1976 | Meidl et al. .................. 210/794 |
| 4,008,159 A | * | 2/1977 | Besik ........................... 210/601 |
| 4,274,968 A | * | 6/1981 | Grutsch et al. ............... 210/666 |
| 4,535,065 A | * | 8/1985 | Klein et al. ..................... 502/21 |
| 4,610,792 A | * | 9/1986 | Van Gils et al. .............. 210/639 |
| 5,256,299 A | * | 10/1993 | Wang et al. .................. 210/664 |
| 5,505,841 A | | 4/1996 | Pirbazari et al. |
| 5,607,593 A | * | 3/1997 | Cote et al. .................... 210/650 |
| 6,159,365 A | * | 12/2000 | Kigel et al. ................... 210/151 |

FOREIGN PATENT DOCUMENTS

| | | |
|---|---|---|
| WO | 01/39869 | 6/2001 |
| WO | 2004/083132 | 9/2004 |

OTHER PUBLICATIONS

Tomaszewska, Maria et al.; "Removal of organic matter from water by PAC/UF system"; Water Researdch 36 (2002) 4137-4143.

\* cited by examiner

WATER TREATMENT METHOD INCLUDING POWDERED ACTIVATED CARBON RECYCLING

This application is a U.S. National Stage Application of PCT Application No. PCT/EP2009/061817, with an international filing date of 11 Sep. 2009. Applicant claims priority based on French Patent Application No. 0856110 filed 11 Sep. 2008. The subject matter of these applications is incorporated herein.

1. FIELD OF THE INVENTION

The field of the invention is that of the treatment of water in order to purify it or make it drinkable.

More specifically, the invention pertains to a method of treatment that includes a step for placing the water to be treated in contact with a powdered reagent such as powdered activated carbon (PAC).

2. PRIOR ART

In the field of the invention, there are known ways of treating water containing especially organic pollution, micropollutants and compounds showing an endocrine disruptor effect, in which the contacting of water to be treated with powdered reagents is combined with the filtration of this water.

FIG. 1 illustrates a prior-art plant for implementing such a method.

As shown in this FIG. 1, such a device comprises a gravity separator 10, a contact chamber 11 and a membrane separator 12 mounted in series.

In the treatment of water using a plant of this kind, the water to be treated is passed into the gravity separator 10 so as to separate a liquid phase from a solid phase.

The liquid phase coming from the gravity separator 10 is then conveyed into the contact chamber 11 within which a powdered reagent 13 is injected.

The powdered reagent is then separated from the water inside the membrane separator 12.

Treated water is then extracted 14 from the plant while the powdered reagent is recycled 15 upstream from the gravity separator 10.

In one variant of this technique, illustrated by dashes in FIG. 1, the powdered reagent 16 is recycled downstream from the stirred chamber 11.

3. DRAWBACKS OF THE PRIOR ART

This technique is efficient in that it enables the appropriate treatment of the water in order to purify it or make it drinkable. However, it has a few drawbacks.

In particular, this technique has the drawback of necessitating the use of a gravity separator so as to separate the liquid phase from the solid phase which includes a part of the recycled powdered reagent.

Implementing a gravity separator such as this dictates low speed of treatment of the water. This gives rise to relatively lengthy treatment times.

Moreover, the implementation of such a gravity separator tends to increase the size of the plants needed to implement such a method of treatment, and these plants are fairly bulky.

Another drawback of this prior-art technique is related to the fact that the time of contact of the water with the powdered reagent within the chamber 11 is relatively long.

Indeed, this technique can be used to inject small quantities of powdered reagent into the water. The concentration of powdered reagent in water within the chamber 11 is of the order of 10 to 30 mg/l.

Consequently, the parameter Ct, which expresses the level of performance of this type of method and is equal to the product of the concentration in powdered reagent and the time of contact of water with the powdered reagent in this type of plant does not exceed 100 to 300 mg·min/l for a contact time of 10 minutes.

Thus, in order to obtain a high Ct value, i.e. in order to obtain a high level of performance, the water must be in contact with the powdered reagent for relatively lengthy periods.

Associating the implementation of a gravity separator with the setting up of contact between the water and the powdered reagent for lengthy periods therefore results in:
 increasing the size of the plants;
 increasing the treatment time;
which leads to:
 relatively low productivity;
 relatively high operating costs.

4. GOALS OF THE INVENTION

The invention is aimed especially at overcoming these drawbacks of the prior art.

More specifically, it is a goal of the invention, in at least one embodiment, to provide a water treatment technique that associates the setting up of contact between this water and a powdered reagent with its filtration, and that shows a high value for the parameter Ct.

It is another goal of the invention, in at least one embodiment, to implement such a water treatment technique of this kind requiring relatively short treatment times, at least as compared with prior art techniques.

The invention is also aimed, in at least one embodiment, at providing a technique of this kind whose implementation calls for plants of relatively limited size, at least when compared with those of the prior-art techniques.

It is also a goal of the invention, in at least one embodiment, to provide a technique of this kind that is efficient and simple to implement.

5. SUMMARY OF THE INVENTION

These goals as well as others that shall appear here below are achieved by means of a method for treating water in order to purify it or make it drinkable, characterized in that it comprises the following steps:
 a step for injecting powdered activated carbon (PAC) into said water so as to obtain a mixture of water to be treated and PAC;
 a step for conveying said mixture of water to be treated and PAC into an stirred contacting area in order to obtain an stirred mixture of water to be treated and PAC;
 a step for filtering said stirred mixture of water to be treated and PAC within a membrane filtration unit in order to produce treated water and a PAC-rich concentrate;
 a step for re-circulating said PAC-rich concentrate upstream and/or within said stirred area;
the concentration in PAC of said mixture ranging from 1 to 10 g/l;
said mixture of water to be treated and PAC being kept in said stirred area for a contact time ranging from 2 to 20 minutes;
said method furthermore comprising a step of ozonation of said water to be treated, the step including the injection of ozone into said water to be treated prior to the injection of PAC so as to obtain a mixture of water to be treated and ozone, the ozone concentration of which ranges from 0.5 to 3 mg/l.

Thus, the invention relies on a novel approach to water treatment by adsorption on PAC in an stirred contacting area followed by filtration.

Such an approach consists, after filtration, in recycling the PAC-rich concentrate just upstream and/or directly within the stirred contacting area.

Because of this recycling, the implementing of the invention thus makes it possible to considerably increase the PAC concentration in the water contained in the contacting area.

Thus, the invention results in a high Ct value while at the same time restricting the time of contact of the PAC and water. For example, if we consider a contacting time for 10 minutes, the Ct of a plant implementing a method according to the invention can reach 50,000 mg·min/l whereas it is in the range of 100 to 300 mg·min/l for a prior art plant.

Furthermore, the technique of the invention does not require the implementing of a gravity separator. This also reduces the water treatment time while reducing the size of the plants needed for treating water.

The treatment of water according to the present technique thus reduces the time of contact of the water with the PAC and the size of the plants needed to implement this technique. The present technique therefore reduces the cost of water treatment.

The implementation of the invention therefore gives a water/PAC mixture in the contacting area which has a very high PAC concentration as compared with the prior-art techniques.

Indeed, according to these techniques, the PAC concentration of the mixture of water and PAC varies only between 10 and 30 mg/l. The invention, which provides that this concentration can reach 10 g/l, multiplies the PAC concentration of the water/PAC mixture by up to 170 times.

The Ct of a technique according to the invention can thus reach very high values while limiting the time of contact between water and PAC.

The duration of the contact time is chosen according to the concentration in pollutant to be eliminated.

Implementing the invention enables water to be treated efficiently and in very short times, at least as compared with prior-art techniques. This therefore leads to reducing operating costs related to the treatment of water.

According to the invention, the method comprises a step of ozonation of said water to be treated, including the injection of ozone into said water to be treated prior to the injection of PAC so as to obtain a mixture of water to be treated and ozone, the ozone concentration of which ranges from 0.5 to 3 mg/l.

The value of this concentration is chosen according to the concentration in pollutant to be eliminated. Such an ozonation makes it possible to:

oxidize the organic molecules into smaller-sized and more easily adsorbable molecules;

oxidize the non-adsorbable molecules, such as especially certain pesticides (glyphosate, AMPA etc), thus improving the rate of reduction of pollution in water; and destroy odorous molecules.

According to an advantageous characteristic, said recirculation step is preceded by a step for extracting used PAC contained in said concentrate.

This makes it possible to discharge spent PAC and to recycle only PAC that it is still active, i.e. PAC whose adsorbent power is not zero.

Preferably, said PAC has a grain size the value of which ranges from 5 to 50 μm.

Such dimensional characteristics give the PAC high aptitude for absorption and make it possible to obtain efficient treatment of the water.

According to an advantageous characteristic, said filtration unit integrates ultra-filtration membranes.

According to another advantageous characteristic, said filtration unit integrates micro-filtration membranes.

The implementation of membranes of either of these types enables the efficient separation of the PAC from the treated water and the efficient retention of the non-adsorbable and non-oxidizable part of the TOC (total organic carbon) of the water to be treated.

The present invention also covers a water treatment plant designed to implement a water treatment method according to the invention.

Such a plant has inlet means for water to be treated, an ozonation tank, an stirred contact area connected to said ozonation tank by a piping, a means for injecting powdered activated carbon (PAC) into said piping, means for discharging a mixture of water and PAC from said stirred area towards a filtration unit, said filtration unit being connected to means for discharging treated water and means for recirculating a PAC-rich concentrate, said means for recirculating said PAC-rich concentrate leading upstream to said stirred area and/or into said stirred area.

According to the invention, said means for recirculating said PAC-rich concentrate lead upstream to said stirred zone and/or into said stirred zone.

Such a plant has the advantage of being relatively compact, at least as compared with the prior-art techniques.

Furthermore, its implementation enables the recycling, just upstream to and/or directly within the contacting area, of the PAC-rich concentrate coming from the filtering of the mixture of water to be treated and PAC. The PAC concentration in water in the contacting area is consequently very high as compared with the techniques of the prior art.

This aspect of the invention therefore gives the present technique a very high Ct.

Implementing the invention therefore increases the performance of water treatment while at the same time reducing the time and space that it requires and therefore the costs associated therewith.

6. LIST OF FIGURES

Other features and advantages of the invention shall appear more clearly from the following description of a preferred embodiment, given by way of a simple illustrative and non-exhaustive example and from the appended drawings, of which:

7. DESCRIPTION OF ONE EMBODIMENT OF THE INVENTION 7.1. Reminder of the Principle of the Invention The invention pertains to the treatment of water by the placing of this water in contact with PAC, in an stirred contacting area and then by filtering it in a membrane filtration unit.

The general principle of this invention lies on the implementation, after adsorption and filtering, of the recycling of the PAC-rich concentrate coming from the filtration just upstream and/or directly within the stirred contacting area.

Implementing such a recycling step considerably increases the PAC concentration in the water contained in the contacting area. Thus, a high Ct is obtained while the PAC/water contact time is limited.

The treatment of the water according to this present invention thus reduces the contact time of water with PAC and the size of the plants needed for its implementation and therefore reduces water treatment costs.

7.3. Example of an Embodiment

7.3.1. Plant

Figure 1:
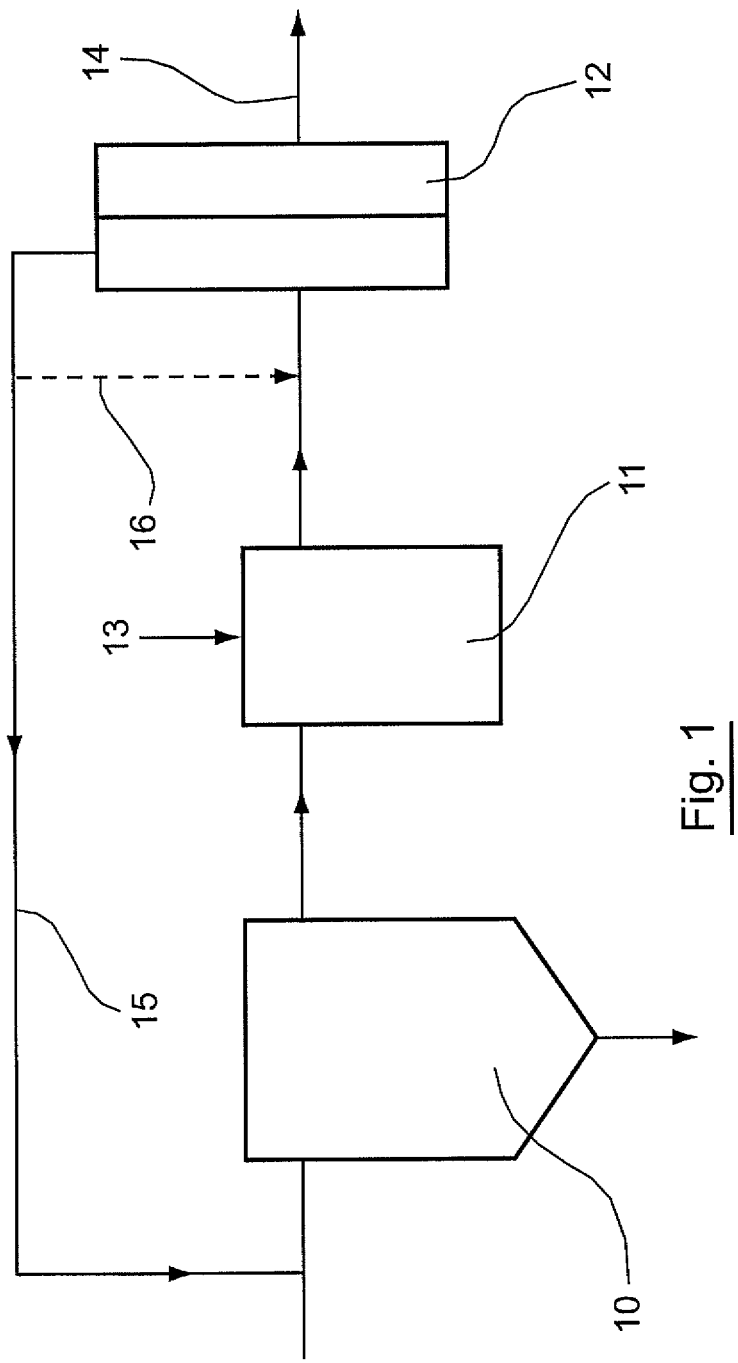
FIG. 1 is a drawing of a treatment plant according to the prior art.
Figure 2:
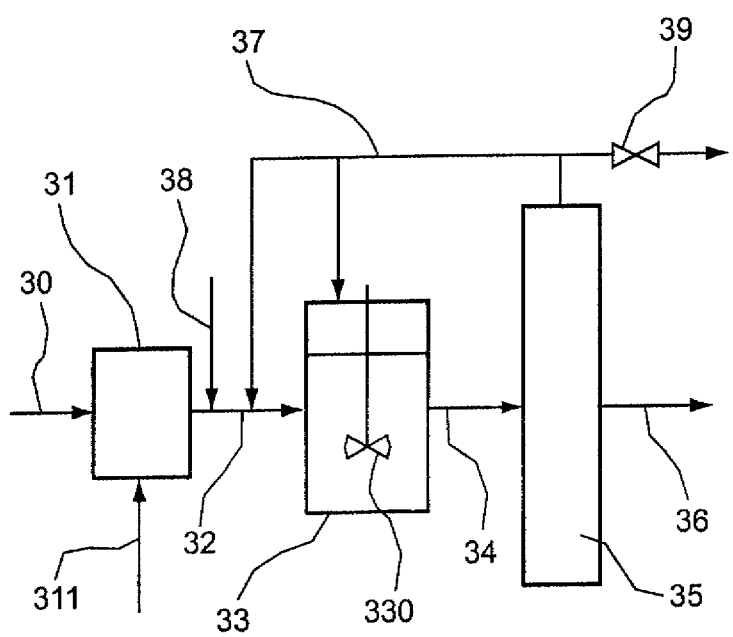
FIG. 2 is a drawing of a plant according to one embodiment of the invention.

Referring now to FIG. 2, we present one embodiment of a plant for implementing a method according to the invention.

As shall be shown in this FIG. 2, such a plant includes an inlet piping for water to be treated 30. This water inlet piping 30 leads into an ozonation tank 31 comprising ozone injectors 311.

The ozonation tank 31 has an outlet which is connected to the inlet of a contacting tank 33 by means of a piping 32.

The contacting tank 33 houses an agitator 330. The contacting tank 33 thus constitutes an stirred tank. The contacting tank 33 has an outlet which is connected to a discharge piping 34.

The discharge piping 34 opens into the inlet of a membrane filtration unit 35.

This filtration unit 35 houses a plurality of ultra-filtration type or micro-filtration type membranes. It has a first outlet connected to a piping for the extraction of treated water 36. It also has a second outlet connected to a piping 37 for recirculating a PAC-rich concentrate.

The piping 37 leads up just upstream of the contacting tank 33 and/or directly into this tank 33.

PAC-injection means 38 are connected to the piping 32. These injection means 38 may for example include one or more injectors.

According to one variant, means for extracting used PAC 39 are connected to the recirculation piping 37. These extraction means may for example include a hydrocyclone or any other type of apparatus enabling the used PAC to be separated from the still active PAC.

7.3.2. Method

A method for treating water by implementing a plant according to this embodiment shall now be described.

In a water-treatment method of this kind, water to be treated is conveyed into the ozonation tank 31 through the inlet piping 30.

The ozone injectors 311 are then implemented so that the ozone concentration of the mixture of water to be treated and ozone contained in the ozonation tank 31 ranges from 0.5 to 3 mg/l. The contact time of ozone and water to be treated in the ozonation tank 31 ranges from 1 to 30 minutes.

The implementation of a step for ozonating water to be treated has many advantages, among them the following:

the ozone oxidizes the organic molecules into smaller-sized and more easily adsorbable molecules;

the ozone oxidizes non-adsorbable molecules such as certain pesticides (glyphosates, AMPA etc), thus improving the reduction of the pollution of water;

the ozone leads to the destruction of the odorous molecules.

The ozonated water inside the ozonation tank 31 is then conveyed into the contacting tank 33 through the piping 32. At the same time, the injection means 38 are implemented so as to inject PAC into the ozonated water to be treated that is circulating in the piping 32.

The PAC injected into the water advantageously has a grain size whose value ranges from 5 to 50 μm. The PAC may for example be of vegetable or mineral origin.

The mixture of PAC and ozonated water conveyed into the contacting tank 33 is shaken there for a contacting time which may vary from 2 to 20 minutes. The PAC concentration of water present in the contacting tank 33 ranges from 1 to 10 g/l.

The stirred mixture of ozonated water and PAC contained in the contacting 33 tank is then conveyed to the filtration unit 35 by means of the discharge piping 34.

This mixture is filtered within the filtration unit 35 in order to produce treated water and a PAC-rich concentrate.

The treated water is extracted by means of the treated water extraction piping 36.

The PAC-rich concentrate coming from the filtration of the mixture of ozonated water and PAC is recycled through the piping 37 up to just upstream of the contacting tank 33 and/or directly into it.

The means 39 for extracting used PAC can be implemented so that only the still active PAC can be recycled.

The combined implementation of ozonation, adsorption on PAC with recycling of PAC and filtration on the membrane makes it possible to:

facilitate the adsorption on PAC of the organic molecules because of the reduction of their size by ozonation;

treat a large part of the adsorbable molecules because of the high Ct value;

treat the non-adsorbable molecules by ozonation;

retain, on the membranes, the non-oxidizable and non-adsorbable part of the TOC which corresponds approximately to 10% of the total TOC.

7.3.3. Trials

The efficiency of a method of treatment according to this second embodiment of the invention was evaluated by treating raw water for which the TOC (total organic carbon) was 5 mg/l.

After ozonation of the water to be treated so that it had an ozone concentration of 2 mg/l, the value of its TOC was at 4 mg/l.

Ozonation alone therefore enables a TOC reduction rate of about 20% to be attained.

The treatment of such an ozonated water so that the PAC concentration of the mixture present in the contacting tank 33 is 20 mg/l and for a contact time of 10 minutes leds to the production of treated water for which the TOC was equal to 3.20 mg/l.

The treatment of raw water by ozonation and adsorption on PAC without recycling the PAC thus enabled a 36% reduction of the TOC in the raw water and a Ct value of 200 mg·min/l. The adsorption increases the reduction of the TOC in raw water by 16% and reduces the TOC of the ozonated water by 20%.

The treatment of raw water by ozonation and adsorption with recirculation of the PAC in such a way that the PAC concentration in the mixture present in the contacting tank 33 was 5 g/l and for a contact time of 10 minutes, led to the production of treated water with TOC equal to 2.00 mg/l.

The treatment of PAC by ozonation and adsorption with recycling of the PAC thus makes it possible to obtain a reduction of 60% of the TOC and a Ct value of 5000 mg·min/l. The implementation of a recycling of the PAC according to the invention therefore increases the reduction of the TOC of the raw water by 24% and increases the value of the Ct by 2400%. The adsorption and recycling reduces the TOC of the ozonated water by 50%.

7.4. Advantages

The implementation of a water treatment technique according to the invention makes it possible especially to:

reduce the treatment time;

reduce the size of the treatment plants, and therefore limit the cost of treatment of the water.

Furthermore, the ozonation step makes it possible to eliminate compounds which thereafter have not been adsorbed on the PAC and thus makes this PAC more available for other compounds.

The invention claimed is:

1. A system for producing drinking water from wastewater comprising:
   an inlet for directing influent wastewater into an ozonation zone configured to ozonate the influent wastewater;
   an injector disposed downstream from the ozonation zone and configured to inject powdered activated carbon (PAC) to the ozonated wastewater;
   a contacting zone disposed downstream from the injector and configured to mix the injected PAC with the ozonated wastewater;
   a membrane filtration unit disposed downstream from the contacting zone and configured to separate treated wastewater from a PAC rich concentrate, the membrane filtration unit including a treated water outlet and a PAC rich concentrate outlet;
   a recirculation line operatively connected to the PAC rich concentrate outlet and the contacting zone and configured to direct the PAC rich concentrate from the membrane filtration unit to the contacting zone; and
   wherein the contacting zone contains a mixture of injected PAC, recirculated PAC rich concentrate, and wastewater and wherein the wastewater contained in the contacting zone has a Ct value of greater than 300 mg·min/l.

2. The system of claim 1 further comprising a separator disposed downstream from the membrane filtration unit configured to receive the PAC rich concentrate from the membrane filtration unit and separate spent PAC from active PAC in the PAC rich concentrate.

3. The system of claim 1 wherein the Ct value is at least 50,000 mg·min/l.

4. A method of treating water and producing treated drinking water comprising:
   directing the water to an ozonating tank;
   injecting ozone into the ozonating tank and mixing the ozone with the water to form ozonated water;
   directing the ozonated water from the ozonating tank;
   after directing the ozonated water from the ozonating tank, injecting powder activated carbon into the ozonated water;
   directing the ozonated water into a powdered activated carbon contact tank downstream from the ozonating tank;
   mixing the powdered activated carbon with the ozonated water in the powdered activated carbon contact tank and producing ozonated water having powdered activated carbon;
   after mixing the powdered activated carbon with the ozonated water in the powdered activated carbon contact tank, directing the ozonated water to a downstream membrane separation unit;
   in the membrane separation unit, separating powdered activated carbon from the ozonated water to form a treated water stream and a powdered activated carbon-rich concentrate;
   recirculating the powdered activated carbon-rich concentrate to the powdered activated carbon contact zone and mixing the powdered activated carbon-rich concentrate with the injected powdered activated carbon and the ozonated water in the powdered activated carbon contact tank; and
   wherein recirculating the powdered activated carbon-rich concentrate includes injecting the powdered activated carbon-rich concentrate into the ozonated water at a point between the ozonating tank and the powdered activated carbon contact tank.

5. The method of claim 4 including injecting the powdered activated carbon into the ozonated water to produce a powdered activated concentration therein of approximately 1 g/l to approximately 10 g/l.

6. The method of claim 4 wherein the powdered activated carbon-rich concentrate is mixed with the injected powdered activated carbon and the ozonated water in the powdered activated carbon contact tank for 2 to 20 minutes.

7. The method of claim 4 further including injecting powdered activated carbon into the ozonated water where the powdered activated carbon has a grain size of approximately 5 μm.

8. The method of claim 4 wherein the membrane separation unit includes an ultrafiltration membrane.

9. The method of claim 4 wherein the membrane separation unit includes a microfiltration membrane.

10. The method of claim 4 including injecting ozone into the water such that the ozone concentration of the ozonated water is approximately 0.5 mg/l to approximately 3 mg/l.

11. The method of claim 4 wherein the water includes a total organic carbon (TOC) concentration of approximately 5 mg/l or higher, and wherein the method producing the treated water stream has at least a 60% reduction in TOC relative to the TOC concentration in the water before treatment.

12. The method of claim 4 wherein mixing the injected powdered activated carbon with the ozonated water in the powdered activated carbon contact zone results in a Ct value of at least 50,000 mg·min/l.

* * * * *